O. E. BAHRENBURG.
DEMOUNTABLE RIM.
APPLICATION FILED MAY 8, 1917.
1,242,310.
Patented Oct. 9, 1917.
2 SHEETS—SHEET 1.
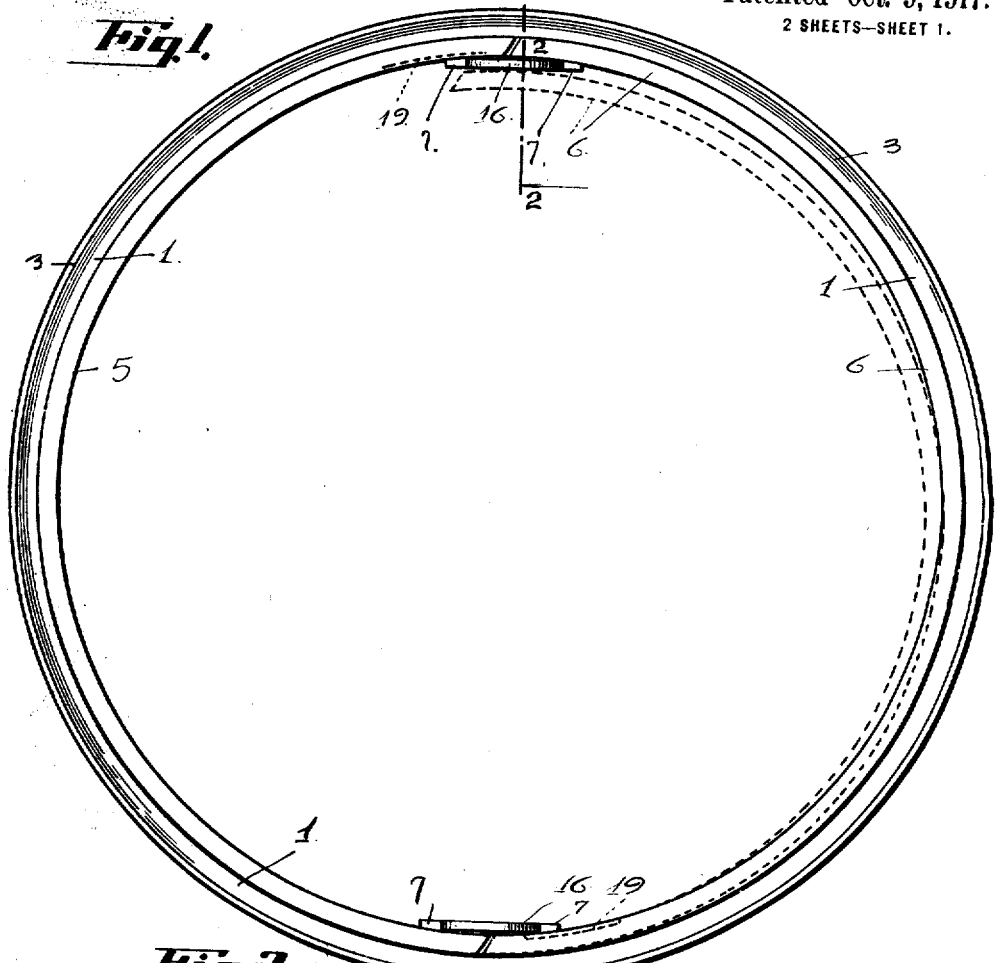
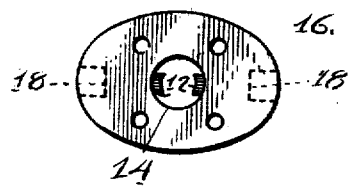
Inventor
Oscar E. Bahrenburg.
By Arthur L. Slee
Atty.

O. E. BAHRENBURG.
DEMOUNTABLE RIM.
APPLICATION FILED MAY 8, 1917.
1,242,310.
Patented Oct. 9, 1917.
2 SHEETS—SHEET 2.
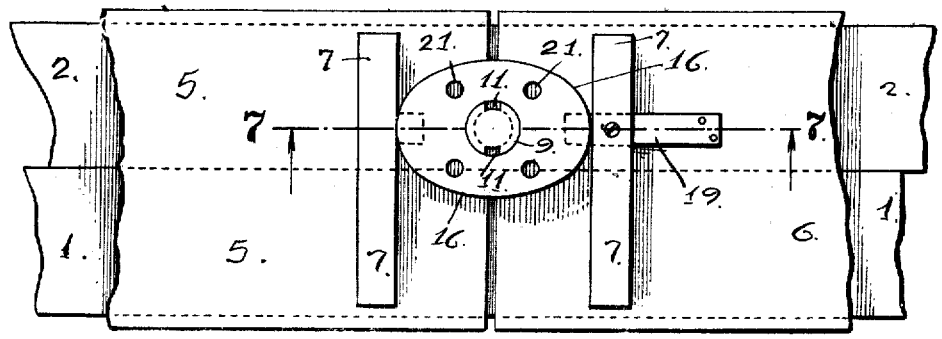
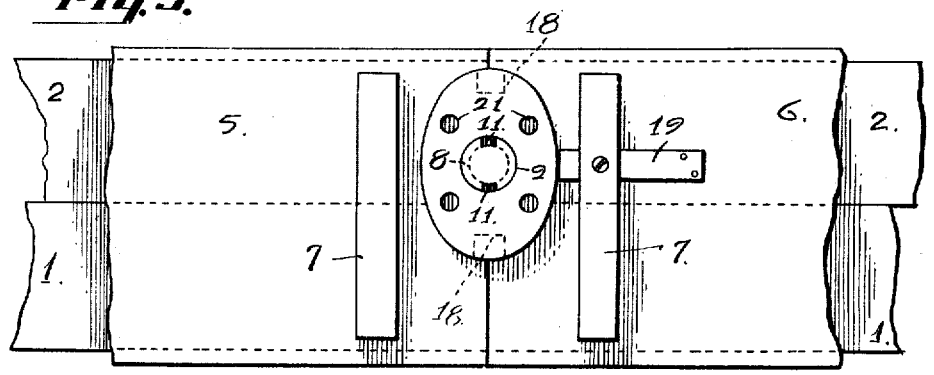
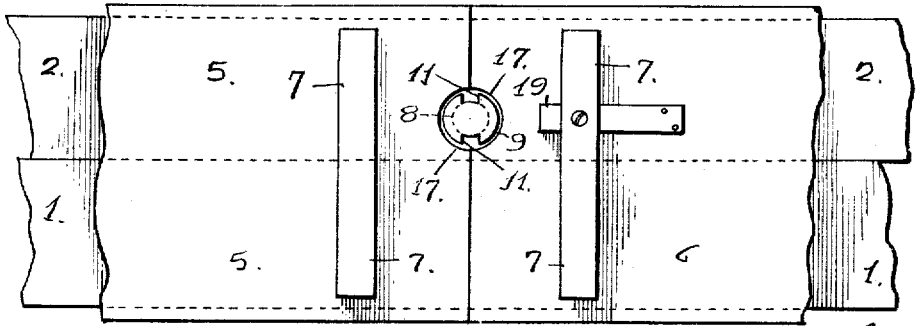
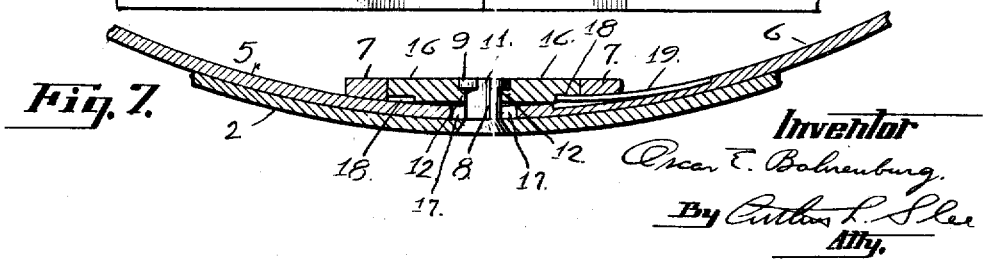
Inventor
Oscar E. Bahrenburg.
By Arthur L. Slee
Atty.

UNITED STATES PATENT OFFICE.

OSCAR E. BAHRENBURG, OF MARIGOLD, CALIFORNIA.

DEMOUNTABLE RIM.

1,242,310.  Specification of Letters Patent.  Patented Oct. 9, 1917.

Application filed May 8, 1917. Serial No. 167,601.

*To all whom it may concern:*

Be it known that I, OSCAR E. BAHRENBURG, a citizen of the United States, residing at Marigold, in the county of Yuba and State of California, have invented a new and useful Improvement in Demountable Rims, of which the following is a full, clear, and exact description, such as will enable others skilled in the art to which it appertains to make and use the same.

My invention relates to improvements in demountable rims wherein a pair of circumferential angles operate in conjunction with semi-circular channels to secure a tire casing onto a vehicle wheel; and the objects of my invention are—

First, to provide an improved demountable rim for vehicle tires of the pneumatic or solid type;

Second, to provide an improved device of the character described that may be easily and quickly separated and re-assembled;

Third, to provide an improved demountable rim having few parts of simple and cheap construction adapted to rigidly engage and retain a tire casing onto a wheel; and Fourth, to provide an improved device of the character described wherein interchangeable parts operate to provide a smooth continuous channel for the retention of a straight side or quick detachable tire.

I accomplish these several objects by means of the device disclosed in the drawings forming a part of the present specification wherein like characters of reference are used to designate similar parts throughout the said specification and drawings, and in which—

Figure 1 is a front elevation of my assembled device;

Fig. 2 is a sectional view taken on line 2—2 of Fig. 1 in the direction indicated;

Fig. 3 is an enlarged detailed plan view of the locking cam removed from the device;

Fig. 4 is an enlarged broken plan view of the lower portion of Fig. 1 disclosing the cam locked in a position to expand the semi-circular channels onto the rims;

Fig. 5 is a similar view disclosing the cam released from the blocks of the channels;

Fig. 6 is a similar view with the cam removed from its pin or pivotal member; and Fig. 7 is a sectional view taken on line 7—7 of Fig. 4 in the direction indicated.

Referring to the drawings, the numeral 1 and the numeral 2 are used to designate what I term a pair of circumferentially divided sections or angles having annular flanges 3 and 4 respectively on their opposite sides whereby a continuous channel may be provided to engage and retain any suitable type of quick detachable or straight side tire casing, not shown.

A pair of semi-circular channels 5 and 6 are provided to be expanded onto the circumferential sections 1 and 2 to secure said sections 1 and 2 together to form a continuous channel. A block 7 is provided on each end of each channel 5 and 6, the purpose of which will hereinafter be more fully set forth.

Each section 1 and 2 is provided with a pin 8 having a flange 9 at the end thereof provided with diametrically opposed channels or slots 11 to permit the passage of diametrically opposed lugs 12 extending within an aperture 14 of a cam 16 which is detachably and rotatably mounted upon the pin 8. The cam 16 is mounted upon the pin 8 by passing the lugs 12 through the slots 11 and then imparting a partial turn to the cam 16 until the lugs 12 thereon rest under the flange 9 of said pin 8.

The pins 8 are arranged when the sections 1 and 2 are properly assembled, in diametrically opposed positions to engage semi-circular apertures or recesses 17 arranged within adjacent ends of the channels 5 and 6 as disclosed in Fig. 6 of the drawings, the purpose of which will hereinafter be more fully described.

Alined with the major axis of the cams 16 and on the under side thereof, I have provided opposed recesses 18 to engage the ends of springs 19 seated or recessed within each circumferential section whereby said cams 16 may be normally retained in a locking position. The cams 16 may be released by depressing the ends of the springs 19.

The cams 16 are also provided with a series of apertures 21 to be engaged by a spanner or other suitable wrench or tool to operate the device.

The operation is as follows:

The circumferential sections 1 and 2 are placed on the beads of a tire casing, not shown, with the flanges 3 and 4 on opposite or farther sides to form a continuous channel. The circumferential sections 1 and 2 are secured in this position by placing one semi-circular aperture or recess 17 on the ends of the semi-circular channels 5 and 6 adjacent opposite pins 8 and spring the opposite ends of said channels 5 and 6 into position, as disclosed in Figs. 1 and 6 of the drawings, to secure the circumferential sections 1 and 2 together.

In order to rigidly engage and retain the channels 5 and 6 in position, the cam is attached and operated to further expand the channels 5 and 6 onto the sections 1 in the following manner.

Each cam 16 is rotatably mounted upon its respective pin 8 by passing the lugs 12 through the slots 11 of the flange 9. The cam 16 will then be in the position disclosed in Fig. 5 of the drawings.

By depressing the end of the spring and engaging the cam 16 through the medium of the apertures 21 therein with a suitable spanner wrench or other similar tool not shown, said cam 16 is rotated through an arc of 90 degrees, the ends alined with the major axis of said cam 16 simultaneously engaging the blocks 7 on the adjacent ends of the semi-circular channels 5 and 6 and expanding the said channels more firmly onto the circumferential sections 1 and 2 to secure said rims 1 and 2 together.

As the cam 16 reaches the position disclosed in Fig. 4 of the drawings, the end of the spring 19 will normally spring into and engage the recess 18 on the under side of the cam 16 and thereby normally lock said cam in operative position.

To demount a tire or casing the above operation is reversed.

It is obvious from the foregoing that I have provided an improved demountable rim adapted to securely retain a tire casing in a simple, easy and effective manner.

Having thus described my invention what I claim as new and desire to secure by Letters Patent is—

1. A demountable rim comprising a pair of circumferentially divided sections to engage a tire casing; a pair of semi-circular channels to engage the circumferential sections to secure the same together; a block secured to each end of each channel; and locking means secured to the circumferentially divided sections to engage adjacent blocks on adjacent ends of the channels and expand said channels onto the circumferential sections.

2. A demountable rim comprising a pair of circumferentially divided sections to engage a tire casing; a pair of semi-circular channels to engage the circumferential sections to secure the same together; a block secured to each end of each channel; locking means secured to the circumferentially divided sections to engage adjacent blocks on adjacent ends of the channels and expand said channels onto the circumferential sections; and means for normally retaining the locking means in locking position.

3. A demountable rim comprising a pair of circumferential sections to engage a tire casing; a pair of semi-circular channels to secure the circumferential sections together; a block secured to each end of each semi-circular channel; and a cam pivotally mounted on each circumferential section at diametrically opposed positions to engage adjacent blocks on adjacent ends of the channels to expand said channels onto the circumferential sections.

4. A demountable rim comprising a pair of circumferential sections to engage a tire casing; a pair of semi-circular channels to secure the circumferential sections together; a block secured to each end of each semi-circular channel; a cam pivotally mounted on each circumferential section at diametrically opposed positions to engage adjacent blocks on adjacent ends of the channels to expand said channels onto the circumferential sections; and means for normally locking the cams in position when the channels are expanded.

5. A demountable rim comprising a pair of circumferentially divided sections to engage a tire casing; a pair of semi-circular channels to secure the circumferential sections together; a block arranged on each end of each channel; a pin secured to each circumferential section and at diametrically opposed positions; and a cam detachably and rotatably mounted upon each pin to engage the blocks on adjacent ends of the channels and expand said channels onto the circumferential sections.

6. A demountable rim comprising a pair of circumferentially divided sections to engage a tire casing; a pair of semi-circular channels to secure the circumferential sections together; a block arranged on each end of each channel; a pin secured to each circumferential section and at diametrically opposed positions; a cam detachably and rotatably mounted upon each pin to engage the blocks on adjacent ends of the channels and expand said channels onto the circumferential sections; and means for normally locking the cams in position when the channels are expanded into engaging relation with the circumferential sections.

In witness whereof I hereunto set my signature.

OSCAR E. BAHRENBURG.